| United States Patent [19] | [11] Patent Number: | 4,588,783 |
|---|---|---|
| Chang | [45] Date of Patent: | May 13, 1986 |

[54] AMIDE-CONTAINING POLYHYDROXYETHYL CARBAMATES

[75] Inventor: Wen-Hsuan Chang, Gibsonia, Pa.

[73] Assignee: PPG Industries, Inc., Pittsburgh, Pa.

[21] Appl. No.: 562,318

[22] Filed: Dec. 16, 1983

[51] Int. Cl.$^4$ ................................................ C08F 8/30
[52] U.S. Cl. ..................... 525/329.9; 525/374;
525/379; 525/382; 525/437; 525/439; 525/454;
525/533; 525/330.1; 528/119; 528/121;
528/288; 528/367
[58] Field of Search ............... 525/186, 423, 424, 425,
525/329.9, 374, 379, 382, 437, 439, 454, 533;
528/327, 341, 119, 121, 288, 367, 330.1

[56] References Cited

U.S. PATENT DOCUMENTS

| 2,627,524 | 2/1953 | Malkemus | 260/482 |
| 2,794,013 | 5/1957 | Drechsel | 260/77.5 |
| 2,802,022 | 8/1957 | Groszos et al. | 260/471 |
| 2,824,857 | 2/1958 | Drechsel | 260/77.5 |
| 3,265,668 | 8/1966 | Dowbenko et al. | 260/77.5 |
| 3,703,538 | 11/1972 | Malkemus et al. | 260/482 C |
| 4,431,795 | 2/1984 | Krimm et al. | |
| 4,484,994 | 11/1984 | Jacobs, III et al. | 204/181 C |

FOREIGN PATENT DOCUMENTS

| 1096204 | 6/1955 | France. |
| 62617 | 6/1955 | France. |

Primary Examiner—John C. Bleutge
Assistant Examiner—Robert E. L. Sellers, II
Attorney, Agent, or Firm—Godfried R. Akorli

[57] ABSTRACT

There is disclosed herein an amide-containing hydroxyethyl carbamate and a coating composition comprising same. The preparation thereof entails the reaction of an amidoamine and a cyclic organic carbonate.

7 Claims, No Drawings

AMIDE-CONTAINING POLYHYDROXYETHYL CARBAMATES

BACKGROUND OF THE INVENTION

1. Field of the Invention

The present invention relates to curable compositions, especially heat-curable compositions and the methods of making and using same. More specifically, the present invention relates to amide-containing polyhydroxyethyl carbamates which can be used as curing agents for active hydrogen-containing materials or as curable film-formers.

2. Brief Description of the Prior Art

Curable compositions containing blocked isocyanates are known in the art. In the main, blocked isocyanates are prepared by reacting isocyanates with blocking agents. This method of preparation has found a wide use despite a number of shortcomings. Principally, the isocyanates are toxic and, therefore, present health hazards. Also, the isocyanates are highly reactive and, therefore, present handling problems. Some of the isocyanates are rather expensive and/or difficult to find. As would be seen, the above shortcomings present limitations on the use of blocked isocyanates as curing agents.

The present invention, without using the isocyanates, provides an alternate method of preparing materials which can be used in the manner of blocked isocyanates particularly in curable coating compositions.

SUMMARY OF THE INVENTION

In accordance with the foregoing, the present invention encompasses an amide-containing polyhydroxyethyl carbamate which is prepared by reacting an amidoamine with an organic carbonate. A distinct advantage of this invention resides in the ability of the amido moiety, conjointly with the carbamate moiety, to impart toughness to a coating derived from a curable composition thereof.

Consonantly, the present invention encompasses a curable composition comprising the polyhydroxyethyl carbamate. Optionally, the curable composition contains an active hydrogen-containing material.

Further, the present invention encompasses a process for curing a compositon containing an active hydrogen-containing material which comprises heating the composition to a temperature sufficient to provide an effective cure; wherein the composition contains a polyhydroxyethyl carbamate which is prepared by reacting an amidoamine with an organic carbonate.

Further, the present invention encompasses a method of providing a decorative or protective coating for a substrate, particularly by electrodeposition. The process comprises applying to the substrate a coating composition comprising a polyhydroxyethyl carbamate, as a curable film-former, or as a curing agent, in an optional combination with an active hydrogen-containing material, followed by heating the coated substrate to a temperature sufficient to effect cure. In an electrodepositable mode, the polyhydroxyethyl carbamate is particularly suitable because it is hydrolytically stable.

DETAILED DESCRIPTION OF THE INVENTION

The amidoamine useful herein can be defined as organic materials containing at least one amino group which is a primary or secondary amino group and also containing at least one group of the structure

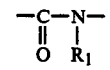

wherein $R_1$ is hydrogen, a hydrocarbyl group or substituted hydrocarbyl group such as alkyl, or aryl group. $R_1$ is preferably hydrogen or an alkyl group, particularly one containing from about 1 to 6 carbon atoms. Preferably, the amidoamines contain two amino groups. More preferably, the two amino groups are primary amino groups.

The amidoamines useful herein can be synthetically prepared by art-known methods. One convenient method of preparing the amidoamines entails reacting a polyester or a functional equivalent thereof with an equivalent excess of a polyamine to effect aminolysis of the polyesters. It is herein preferred to use two amino groups per one ester group. The reaction is generally conducted over a temperature range of 160° to 220° C. The esters useful herein and the methods of preparing same are also known in the art. Preferred herein are aliphatic esters. Particularly preferred are simple diesters of polycarboxylic acids, although higher functional polyesters can be used preferably in combination with the diesters. The polycarboxylic acids contain preferably from 2 to 36, more preferably 4 to 20, and most preferably 4 to 12 carbon atoms. In preparing the polyesters, the polycarboxylic acids are reacted with polyols, and preferably with short chain alcohols such as methanol, and also with phenols. Non-limiting examples of these diesters are dimethyl phthalate, diethyl phthalate, dimethyl terephthalate, dimethyl adipate, dimethyl hexahydrophthalate and dimethyl cyclohexane dicarboxylate. Yet another convenient method of preparing the amidoamines entails reacting a lactone, e.g., caprolactone, with a polyamine.

The polyamines useful herein contain preferably from about 2 to 20, and more preferably from about 4 to 15, and most preferably from about 6 to 12 carbon atoms. Preferred herein are aliphatic polyamines. Particularly preferred are diamines, although higher functional polyamines can be used, preferably in combination with the diamines. Non-limiting examples of the diamines are isophoronediamine, menthanediamine, polypropylene oxide diamine and hexamethylenediamine.

The organic carbonates useful herein are cyclic. Non-limiting examples of the cyclic carbonates are alkylene carbonates such as ethylene carbonate and propylene carbonate. In combination with the cyclic carbonate, non-cyclic carbonates such as dimethyl carbonate, diethyl carbonate, diphenyl carbonate, 2-ethylhexyl carbonate and hexyl-2-ethoxyethanol carbonate can be used.

The reaction of polyamines with cyclic carbonates usually can be carried out at room temperature, although higher temperatures can be used to speed up the reaction. In the reaction of the non-cyclic organic carbonates, catalysts such as basic catalysts, e.g., potassium t-butoxide, can be employed. In carrying out the reaction, the amidoamine is reacted with the organic carbonate in proportions that can vary depending, for example, upon the particular starting reactants employed and the conditions of the reaction. In general, at least one or more amine group is present for each mole of the organic carbonate. The temperature of the reaction can vary depending, for example, on the particular reactants employed, the desired rate of reaction and the like. Generally, the reaction involving the non-cyclic carbonate can be carried out at about 140° C. The reaction can be conducted in the absence of a solvent or in the presence of solvents that are relatively inert. Examples of the useful solvents are dimethyl formamide, N-methyl pyrrolidone and the like.

The resultant reaction mixture comprising the polyhydroxyethyl carbamate with the solvent and any unreacted ingredients, can be used without any separation. An example of the preferred polyhydroxyethyl carbamate is bis-(hydroxyethyl)carbamate or substituted bis(hydroxyethyl) carbamate such as 2-methyl-2-bis(hydroxyethyl)carbamate which can effect cure at relatively low temperatures.

In the practice of the invention, the polyhydroxyethyl carbamate is useful as a curable material, or in combination with active hydrogen-containing materials to form curable compositions such as coating compositions. The active hydrogen group can be hydroxy, primary or secondary amino or thio group. Non-limiting examples of the active hydrogen-containing materials are hydroxyl group-containing polymers, e.g., polymeric polyols, such as alkyd polymers, polyester polymers, hydroxyl group-containing acrylic polymers, hydroxyl group-containing polyurethane polymers, hydroxyl group-containing polyurea polymers, hydroxyl group-containing polyether polymers, hydroxyl group-containing epoxy polymers and hydroxyl group-containing polymers which are polyepoxide-amine adducts. The epoxy polymers can be epoxy-free or epoxy-containing.

The molecular weights of the polymeric polyols can vary over a wide range depending upon their type and on whether the curable composition is organic solvent-based or water-based and also on the desired performance characteristics of the coating. Polyester, epoxy and alkyd polymers can have molecular weights as low as about 300 and as high as about 50,000, preferably the molecular weights are usually in the range of about 1,000 to 5,000; the molecular weights being on a number average basis relative to polystyrene, as determined by gel permeation chromatography. Acrylic polymers prepared by solution polymerization can have molecular weights of about 100,000 or higher, and usually in the range of about 1,500 to 50,000 on a number average basis relative to polystyrene, as can be determined by gel permeation chromatography. For acrylic latices, the molecular weight can range from 100,000 to several millions.

The hydroxyl content of the polymeric polyol should be sufficient such that when the polyol is in combination with the curing agent, the composition will cure to a hard coating. Generally, the hydroxyl number of the polymeric polyol will be at least about 50 and preferably will be in the range of about 100 to 300, based on resin solids.

A preferred class of polymeric polyols are hydroxyl group-containing epoxy polymers. A particularly preferred class of polymeric polyols are the polyepoxide-amine adducts. The epoxy polymers which can be used in the practice of the invention are polyepoxides, that is, polymers having a 1,2-epoxy equivalency greater than 1, preferably about 2 or more. Preferred are polyepoxides which are difunctional with regard to epoxy. The preferred polyepoxides are polyglycidyl ethers of cyclic polyols. Particularly preferred are polyglycidyl ethers of polyphenols such as bisphenol A. Examples of polyepoxides are given in U.S. Pat. No. 4,260,716, column 3, line 20, to column 4, line 30, the portions of which are hereby incorporated by reference.

Besides the epoxy polymers disclosed above, other epoxy-containing polymers which can be used are acrylic polymers which contain epoxy groups. These polymers are formed by polymerizing an unsaturated epoxy group-containing monomer such as glycidyl acrylate or methacrylate with one or more other polymerizable ethylenically unsaturated monomers. Examples of these polymers are described in U.S. Pat. No. 4,001,156, column 3, line 59, to column 5, line 60, the portions of which are hereby incorporated by reference.

Examples of amines which can be used in preparing the polyepoxideamine adduct are ammonia, primary, secondary and tertiary amines and mixtures thereof. The reaction product of the polyepoxide and the amine can be at least partially neutralized with an acid to form a polymeric product containing amine salt and/or quaternary ammonium salt groups. Reaction conditions of polyepoxides with amines, examples of various amines and at least partial neutralization with acid are disclosed in U.S. Pat. No. 4,260,720, column 5, line 20, to column 7, line 4, the portions of which are hereby incorporated by reference.

Also, various polyepoxide-amine adducts are described in European Patent Application No. 0012463.

With regard to the amount of organic amine and polyepoxide which are reacted with one another, the relative amounts depend upon the extent of cationic base such as cationic salt group formation desired and this in turn will depend upon the molecular weight of the polymer. The extent of cationic salt group formation and the molecular weight of the reaction product should be selected such that when the resultant cationic polymer is mixed with aqueous medium, a stable dispersion will form. A stable dispersion is one which does not settle or is one which is easily dispersible if some sedimentation occurs. In some embodiments, the dispersion should additionally be of sufficient cationic character that the dispersed polymer particles will migrate towards the cathode when an electrical potential is impressed between an anode and a cathode immersed in aqueous dispersion.

Also, the molecular weight, structure and extent of cationic salt group formation should be controlled such that the dispersed polymer will have the required flow to form a film on the substrate; in the case of electrodeposition, to form a film on the cathode. The film should be insensitive to moisture to the extent that it will not redissolve in the electrodeposition bath or be rinsed away from the coated surface after removal from the bath.

In general, most of the cationic polymers useful in the practice of the invention will have average molecular weights within the range of about 500–100,000 and contain from about 0.01 to 10, preferably about 0.1 to 5.0, preferably from about 0.3 to 3.0 milliequivalents of basic group, e.g., cationic group, per gram of resin solids. Obviously one must use the skill in the art to couple the molecular weight with the cationic group content to arrive at a satisfactory polymer. The polyglycidyl ethers will have molecular weights of about 500 to 10,000, preferably 1,000 to 5,000. Acrylic polymers, on the other hand, will have molecular weights as high as 100,000, preferably 5,000 to 50,000.

Besides the cationic polymers, anionic polymers which are designed to form aqueous-based coating compositions may be used in coating applications such as electrodeposition. It should also be appreciated that organic solvent-based coating compositions employing the above polymers without ionic salt groups can also be used. Formulating coating compositions with such polymers is well known in the art and need not be described in any further detail.

As a curable material, the polyhydroxyethyl carbamate can be employed as a self-curing material. Alternately, it can be employed in combination with a compatible curing agent such as isocyanates, aminoplasts or phenoplasts. A compatible cure catalyst can be employed with the curing agent.

As a curing agent, the polyhydroxyethyl carbamate is preferably present in an amount sufficient to impart excellent cure to the curable composition. Typically, it is present in an equivalent ratio of 0.1:1 and preferably 0.3 to 1:1. The polyhydroxyethyl carbamate is usually employed in combination with a cure catalyst. Typically, the cure catalyst is a metal salt and/or complex of a metal such as lead, zinc, iron, tin and manganese. Suitable salts of these metals are, for example, octoates and naphthanates. A suitable complex is, for example, acetyl acetonate. The cure catalyst is used in amounts sufficient to effect cure at the relatively low temperatures described herein. For example, the metal salt and/or complex is employed as a cure catalyst in amounts of about 0.1 to 2.0, preferably 0.2 to 1 percent metal by weight (solids) based on the weight of the curable composition. The cure catalyst can be mixed simultaneously with other starting materials for the preparation of the coating composition, or introduced into the coating composition in any order that is convenient. Other cure catalysts such as amines, phosphonium and ammonium salts such as ethyltriphenyl phosphonium acetate and the like can also be used.

In the practice of the invention, the curable compositions can be used as water-based or solvent-based coating compositions. The components of the coating composition must be homogeneous or a dispersion. If the components are a liquid and of sufficiently low viscosity, they can be mixed together neat to form the coating composition. Alternately, if the components are higher viscosity liquids or solids, the components can be mixed with a diluent to reduce the viscosity of the composition so that it may be suitable for coating applications.

By liquid diluent is meant a solvent or a non-solvent which is volatile and which is removed after the coating is applied and is needed to reduce viscosity sufficiently to enable forces available in simple coating techniques, that is, brushing and spraying, to spread the coating to controllable, desired and uniform thickness. Also, diluents assist in substrate wetting, resinous component compatibility and coalescence or film formation. Generally, when used, the diluent will be present in the composition in amounts of about 20 to 90, preferably 50 to 80 percent by weight based on total weight of the coating composition, although more diluent may be employed depending upon the particular coating application.

Examples of suitable liquid diluents for organic solvent-based coatings will depend somewhat on the particular system employed. In general, strong solvents such as N-methyl-pyrrolidone and dimethyl formamide are preferred. Other solvents such as ketones, e.g., methyl ethyl ketone and methyl isobutyl ketone; alcohols such as isopropyl alcohol, normal butyl alcohol, monoalkyl ethers of glycols such as 2-alkoxyethanol, 2-alkoxypropanol and compatible mixtures of these solvents can be used.

Besides organic solvents, water can be used as a diluent either alone or in combination with water-miscible organic solvents. When water is used, the coating composition is usually modified such as by incorporating water-solubilizing groups such as the cationic groups mentioned above to provide for the necessary solubility in water. Besides the cationic groups mentioned above, other water-solubilizing groups such as non-ionic groups, for example, ethylene oxide groups, and anionic groups such as carboxylate salt groups may be introduced into the polymer to disperse or solubilize the coating composition in water.

The coating compositions of the invention may also optionally contain a pigment. Pigments may be of any conventional type, comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake.

The pigment content of the coating composition is usually expressed as the pigment-to-resin weight ratio. In the practice of the present invention, pigment-to-resin weight ratios can be 2:1 or higher, and for most pigmented coatings, are usually within the range of about 0.05 to 1:1.

In addition to the above ingredients, various fillers, plasticizers, anti-oxidants, ultraviolet light absorbers, flow control agents, surfactants and other formulating additives can be employed if desired. These materials are optional and generally constitute up to 30 percent by weight of the coating composition based on total solids.

The coating compositions of the invention can be applied by conventional methods, e.g., non-electrophoretic methods including brushing, dipping, flow coating and spraying. Usually, they can be applied virtually over any substrate including wood, metal, glass, cloth, leather, plastic, foam and the like, as well as over various primers. For electroconductive substrates such as metals, the coatings can be applied by electrodeposition. In general, the coating thickness will vary somewhat depending upon the application desired. In general, coatings from about 0.1 to 10 mils can be applied and coatings from about 0.1 to 5 mils are usual.

When aqueous dispersions of the coating composition are employed for use in electrodeposition, the aqueous dispersion is placed in contact with an electrically conductive anode and an electrically conductive cathode. The surface to be coated can be made the cathode or the anode. In the case of cationic electrodeposition, which is preferred herein, the surface to be coated is the cathode. Following contact with the aqueous dispersion, an adherent film of the coating composition is deposited on the electrode being coated when a sufficient voltage is impressed between the electrodes. Conditions under which electrodeposition is carried out are known in the art. The applied voltage may be varied and can be, for example, as low as one volt or as high as several thousand volts, but is typically between 50 and 500 volts. Current density is usually between 1.0 ampere and 15 amperes per square foot and tends to decrease during electrodeposition indicating the formation of an insulating film.

After the coating has been applied, it is cured by heating at elevated temperatures for a period of time sufficient to form solvent-resistant and/or hard coatings. By solvent-resistant coatings is meant that the coating will be resistant to acetone, for example, by rubbing across the coating with an acetone-saturated cloth. Coatings which are not cured or poorly cured will not withstand the rubbing action with acetone and will be removed with less than 10 acetone double rubs. Cured coatings, on the other hand, will withstand a minimum of 20 acetone double rubs, and preferably 100 acetone double rubs.

It has been found that substrates coated with compositions employing the polyhydroxyethyl carbamates can cure at relatively lower temperatures. In certain embodiments of the invention, it has been found that the preferred polyhydroxyethyl carbamates impart excellent cure at temperatures of 325° F. (163° C.) or lower.

These and other aspects of the invention are illustrated more specifically by the following non-limiting examples.

EXAMPLE 1

This example illustrates the preparation of the amidoamines which are useful in preparing the polyhydroxylethyl carbamate:

| Ingredients | Moles | Parts by Weight (grams) |
| --- | --- | --- |
| Isophorone diamine | 2 | 380 |
| Dimethylcyclohexane dicarboxylate | | 200 |

The above ingredients were charged to a reaction vessel equipped with a thermometer and a boiling stone, heated over a period of 95 minutes to a temperature range of 203° to 216° C., whereat 64 grams of methanol was vented off (in weight loss). The resultant amidoamine was discharged and stored.

EXAMPLE 2

This example illustrates the preparation of the amide-containing poly(hydroxyethyl carbamate).

| Ingredients | Parts by Weight (grams) |
| --- | --- |
| The amidoamine of Example 1 | 307 |
| N—methyl-pyrrolidone | 100 |
| Propylene carbonate | 111.5 |

The amidomine from Example 1, having solidified overnight, was dissolved in N-methyl-pyrrolidone by heating to 190° C. The dissolved amidoamine in the N-methyl-pyrrolidone was cooled to 165° C. and the propylene carbonate was added thereto. The reaction temperature of the reaction mixture dropped to 140° C. The resultant product comprising polyhydroxyethyl carbamate was viscous. Three hundred (300) grams of the product were effectively thinned with additional 30 grams of N-methyl-pyrrolidone to give a product with 74 percent resin solids.

Evaluation: In the following, performance of the amide-containing polyhydroxyethyl carbamate of Example 2 was assessed.

Self-Curing: 20 grams of the amide-containing polyhydroxyethyl carbamate were dissolved with 5 grams of methylisobutyl ketone in the presence of 0.3 gram dibutyltin dilaurate. The resultant mixture was drawn down on a cold roll steel panel to form a coating of 3-mil thickness. The coating was baked at 325° F. (163° C.) for 30 minutes to produce a hard, cured coating of HB pencil hardness.

Polyol-Curing: 20 grams of the amide-containing polyhydroxyethyl carbamate were dissolved with 7 grams of methylisobutyl ketone and blended with 1.7 grams of PCP-0301 (polycaprolactone polyol available from Union Carbide), in the presence of 1.9 grams of dibutyltin dilaurate. The blend was drawn down on a cold roll steel panel to form a coating of 3-mil thickness. The coating was baked at 325° F. (163° C.) for 30 minutes to produce a cured flexible coating of 6B pencil hardness.

Isocyanate-Curing: 20 grams of the amide-containing polyhydroxyethyl carbamate were dissolved with 7 grams of methylisobutyl ketone and blended with 3.7 grams of DESMODUR N100 (the biuret from 1,6-hexamethylene diisocyanate, available from Mobay Chemical), in the presence of 1.9 grams of dibutyltin dilaurate. The blend was drawn down on a cold roll steel panel to form a coating of 3-mil thickness. The coating was baked at 325° F. (163° C.) for 30 minutes to produce a cured coating of HB pencil hardness.

Melamine-Curing: 20 grams of the amide-containing polyhydroxyethyl carbamate were dissolved with 7 grams of methylisobutyl ketone and blended with CYMEL 300 (melamine-type curing agent, available from American Cyanamid Company) and 0.5 grams of p-toluene sulphonic acid (available as CYCAT 40/40 from American Cyanamide). The blend was drawn down to form a coating of 3-mil thickness. The coating was baked at 250° F. (121° C.) for 30 minutes to produce a cured flexible coating of 6B pencil hardness.

EXAMPLE 3

This illustrates another method of preparing the amidoamines useful herein.

| Ingredients | Moles | Parts by Weight (grams) |
| --- | --- | --- |
| Isophorone diamine | 2 | 340 |
| Caprolactam | 2 | 226 |

The above ingredients were charged to a properly equipped reaction vessel and heated to 200° C. over a period of 10 hours. Gel permeation chromatograph indicated that amidoamine had been prepared.

An amide-containing polyhydroxyethyl carbamate was prepared using the amidoamine from above. The following were used in the preparation.

| Ingredients | Moles | Parts by Weight (grams) |
| --- | --- | --- |
| The amidoamine, from above | 1 | 283 |
| Propylene carbonate | 2 | 204 |

The above ingredients were mixed and allowed to react at room temperature for a period of a week.

EXAMPLE 4

An electrodepositable composition comprising an epoxy resin and the amide-containing polyhydroxyethyl carbamate of Example 2 as a curing agent was prepared and used as follows.

| Ingredients | Solids (gram) | Equivalent | Parts by Weight (grams) |
|---|---|---|---|
| | Charge 1 | | |
| Epoxy resin[1] | 385.1 | 0.875 | 392.2 |
| 5,5-dimethylhydantoin | 27.5 | 0.729 | 27.5 |
| Ethyltriphenylphosphonium lactate | 0.88 | — | 8.8 |
| | Charge 2 | | |
| 2-ethylhexanol | Charge 3 | — | 73.8 |
| Dimethylethanol amine lactate | 59.2 | 0.335 | 78.9 |
| Dionized water | — | 1.68 | 30.2 |
| | Charge 4 | | |
| Dionized water | Charge 5 | 7.27 | 131.3 |
| Amide-containing hydroxyethyl carbamate of Example 2, 77.1% in N—methyl-pyrolidone | 157.8 | — | 212.9 |

[1]This epoxy resin has an epoxy equivalent of 428.9. It was derived from Bisphenol A, and EPON 828 which was available from Shell Chemical Co., and had an epoxy equivalent of 188.

Into a four-necked reaction flask, equipped with a stirrer, water-condensor Dean-Stark trap, and a thermometer, was introduced, Charge 1 which was heated to react under a nitrogen blanket. Heating was continued to 150° C. with a resulting exotherm and a temperature rise to 180° C. The reaction mixture was held over 160° to 170° C. for 19 minutes and cooled. Gardner-Holdt viscosity of the reaction mixture was measured at 25° C. as 0+ using a 50/50 mixture of the reaction mixture and propyleneglycol monoethylether, available from Dow Chemical Co. Thereafter, Charge 2 was introduced into the flask at 135° C. About 7 minutes thereafter and at 101° C., addition of Charge 3 was commenced. After the completion of the addition the reaction temperature having dropped to 82° C. increased to 90° C. by heating and held for 2 hours. Charge 4 was added and the reaction mixture cooled to 70° C. Thereafter Charge 5 was added and the reaction mixture digested for about 20 minutes.

500 grams of the above reaction mixture was reversed thinned with 209.4 grams of water. The resultant mixture was then thinned directly with 506.7 grams of water to obtain a dispersion having a theoretical solid content of 28 percent. 642.9 grams of the above dispersion was further thinned with 1157.1 grams of water to obtain a dispersion having a theoretical solids content of 10 percent.

The above dispersion was used to electrocoat panels of iron-phosphated steel substrate and zinc phosphated steel substrate at 150 volts for 90 seconds and panels of untreated steel substrate at 100 volts for 90 seconds. One set of the respective coated panels was baked at 350° F. The coatings cured well in that it took 35 acetone double-rubs to remove them. Another set of the respective coated panels was baked at 400° F. These coatings cured well in that it took 50 acetone double-rubs to remove them.

These specific examples and the foregoing description of the invention are illustrative and are not intended either to scope or content to limit the invention as claimed. Hence, what will be considered by the skilled artisan to be the equivalent of the claimed invention is also hereby encompassed.

What is claimed is:
1. A curable composition comprising:
   (A) an amide-containing polyhydroxyethyl carbamate which is prepared by reacting:
      (1) an amidoamine, and
      (2) a cyclic organic carbonate, and
   (B) an active hydrogen-containing material which is external or internal to the carbonate of (A) and is different therefrom comprising a hydroxyl group-containing polymer selected from the group consisting of an epoxy polymer, an acrylic polymer, a polyurethane polymer and a polyester polymer.
2. A curable composition of claim 1, wherein the amidoamine is derived from the reaction of a polyester or an equivalent thereof with an equivalent excess of polyamine.
3. A curable composition of claim 2, wherein the polyester contains from about 4 to 20 carbon atoms.
4. A curable composition of claim 3, wherein the polyester is a reaction product of a polycarboxylic acid which is a dicarboxylic acid and a short chain alcohol which is methanol.
5. A curable composition of claim 3, wherein the polyester is aliphatic.
6. A curable composition of claim 2, wherein the polyamine is selected from the group consisting of isophoronediamine, methanediamine, hexamethylenediamine.
7. A curable composition of claim 1, wherein the cyclic organic carbonate is ethylene carbonate or propylene carbonate.

* * * * *